US007711941B2

(12) United States Patent
Henry et al.

(10) Patent No.: US 7,711,941 B2
(45) Date of Patent: May 4, 2010

(54) METHOD AND APPARATUS FOR BOOTING INDEPENDENT OPERATING SYSTEMS IN A MULTI-PROCESSOR CORE INTEGRATED CIRCUIT

(75) Inventors: Russell J. Henry, Wichita, KS (US); James K. Sandwell, Cheney, KS (US)

(73) Assignee: LSI Corporation, Milpitas, CA (US)

( * ) Notice: Subject to any disclaimer, the term of this patent is extended or adjusted under 35 U.S.C. 154(b) by 668 days.

(21) Appl. No.: 11/642,045

(22) Filed: Dec. 19, 2006

(65) Prior Publication Data

US 2008/0148034 A1 Jun. 19, 2008

(51) Int. Cl.
*G06F 9/00* (2006.01)
*G06F 13/00* (2006.01)

(52) U.S. Cl. ................................ 713/1; 713/2; 711/152

(58) Field of Classification Search ...................... 713/1
See application file for complete search history.

(56) References Cited

U.S. PATENT DOCUMENTS 5,448,716 A * 9/1995 Hardell et al. .............. 713/375
5,867,702 A * 2/1999 Lee .............................. 713/1
6,012,142 A * 1/2000 Dokic et al. .................. 713/2
6,347,372 B1 * 2/2002 Takashima et al. ............ 713/2
6,594,756 B1 * 7/2003 Datta et al. .................... 713/2
6,779,090 B2 * 8/2004 McKenney et al. ......... 711/152
7,305,544 B2 * 12/2007 Bulusu et al. ................. 713/2

* cited by examiner

*Primary Examiner*—Suresh K Suryawanshi
(74) *Attorney, Agent, or Firm*—Westman, Champlin & Kelly, P.A.; David D. Brush

(57) ABSTRACT

A multiple-processor system and boot procedure are provided. The system includes an integrated circuit having first and second embedded processors. A volatile memory and a non-volatile memory are shared by the first and second processors. The non-volatile memory includes a set of boot load instructions executable by the first and second processors.

19 Claims, 3 Drawing Sheets

METHOD AND APPARATUS FOR BOOTING INDEPENDENT OPERATING SYSTEMS IN A MULTI-PROCESSOR CORE INTEGRATED CIRCUIT

FIELD OF THE DISCLOSURE

The present disclosure relates to embedded firmware and more particularly to the architecture of embedded boot firmware, such as that used to boot a semiconductor integrated circuit having one or more embedded processors.

BACKGROUND OF THE DISCLOSURE

With the advent of multi-processing core integrated circuit chips, multiple processing cores are implemented on the same integrated circuit. With these types of integrated circuits, the inventors of the present application desired to develop an integrated circuit in which each processing core is able to execute an independent operating system. A boot structure is therefore desired to get each processor core executing its respective operating system upon reset.

The present disclosure provides such a boot structure.

SUMMARY

A first embodiment of the disclosure relates to a multiple-processor system. The system includes an integrated circuit having first and second embedded processors. A volatile memory and a non-volatile memory are shared by the first and second processors. The non-volatile memory includes a set of boot load instructions executable by the first and second processors.

A second embodiment of the disclosure relates to a boot process. The boot process includes: a) executing boot load instructions stored in non-volatile memory by each of first and second processors embedded on the same integrated circuit; b) placing the second processor in a second processor loop in response to the instructions until the first processor rings a second processor doorbell; c) executing an initialization procedure for the integrated circuit by the first processor in response to the instructions; d) ringing the second processor doorbell upon completion of at least a portion of the initialization procedure; and e) releasing the second processor from the second processor loop after the second processor doorbell has been rung.

DETAILED DESCRIPTION OF ILLUSTRATIVE EMBODIMENTS

Figure 1:
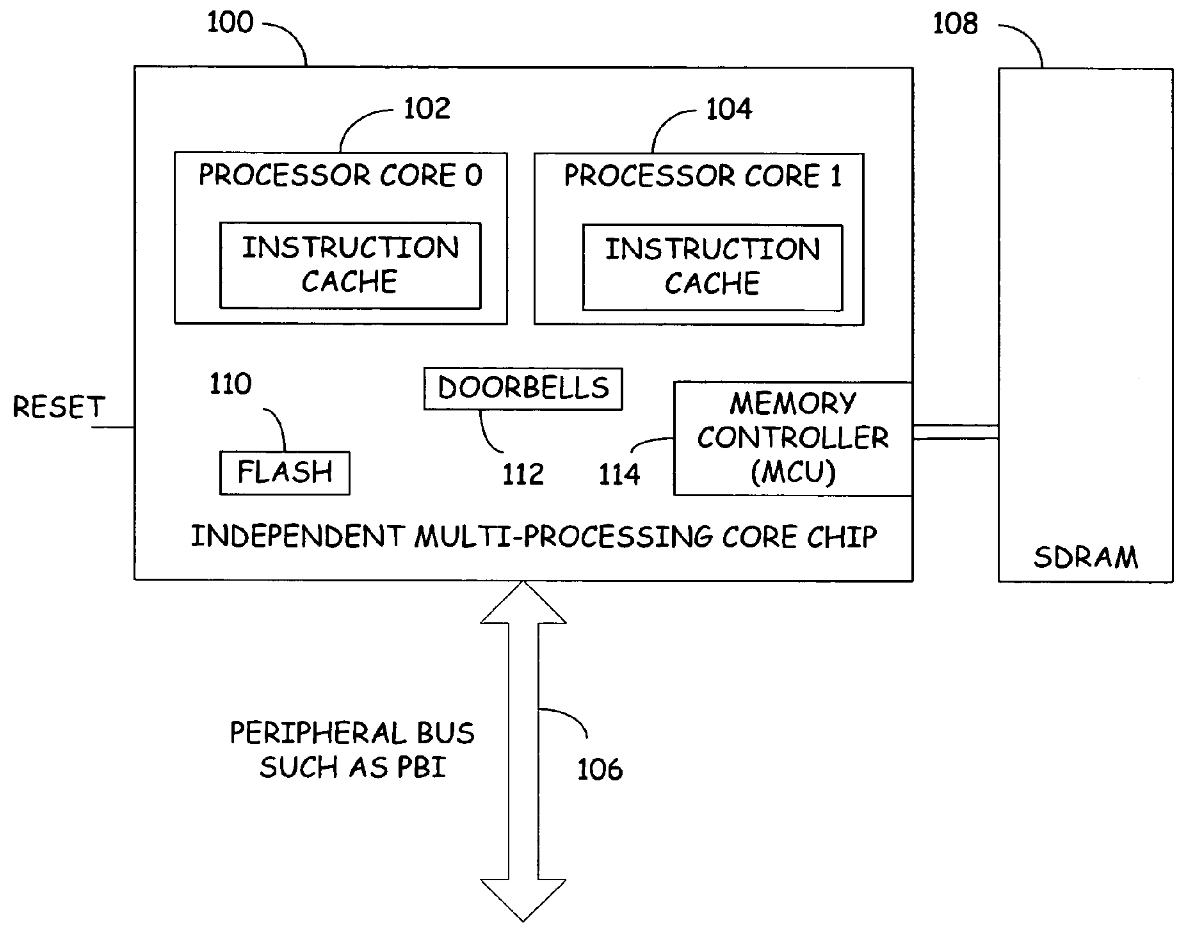
FIG. 1 is a block diagram illustrating an example of an integrated circuit having independent, multi-processing cores.

FIG. 1 is a block diagram illustrating an example of an integrated circuit 100 having independent, multi-processing cores (referred to as "processors") 102 and 104, which are labeled "Core 0" and "Core 1", respectively. Processors 102 and 104 can include any type or types of processors that are capable of executing instructions. For example, processors 102 and 104 can include any collection of components that together interpret instructions and process data contained in a computer program or code. An example of a processor is known as a microprocessor. Other types can also be used. Each processor 102 and 104 can include an instruction cache into which instructions are loaded and executed. Processors 102 and 104 are embedded within the core area of integrated circuit 100. Processors 102 and 104 are independent processing cores, which execute independent operating systems through their respective instruction caches.

In one embodiment, integrated circuit 100 represents a single, unitary integrated circuit die. Integrated circuit 100 is coupled to one or more external components, such as a peripheral bus 106 and a volatile memory 108. In one embodiment, peripheral bus 106 includes a parallel bus interface (PBI), and the external memory 108 includes one or more random access memories (RAMs), such as one or more SDRAMs.

Among other elements, integrated circuit 100 further includes a non-volatile memory 110, a set of "doorbell" registers 112, a memory controller unit (MCU), which is coupled to volatile memory 108, and a reset input, labeled RESET. Non-volatile memory 110 and volatile memory 108 can be implemented externally or internally to integrated circuit 100. Non-volatile memory 110 can include any suitable non-volatile memory type, such as flash memory, and stores a variety of software instructions and applications that are executable by one or more of the processors 102 and 104 for initializing integrated circuit 100 and booting processors 102 and 104 according to a predetermined boot procedure.

Non-volatile memory 110 (hereinafter referred to as flash memory) can include contents, such as including boot instructions, a first operating system for processor 102, a second operating system for processor 104, one or more applications for executing on processors 102 and/or 104, debug software, diagnostics software and other software drivers. In one example, the first operating system includes a VxWorks® operating system (Wind River Systems of Alameda, Calif., USA) for processor 102, and the second operating system includes a Linux operating system for processor 104. Other operating systems can be used in alternative embodiments, and each processor can execute the same or different types of operating systems. The applications can include any suitable applications. In one example, flash memory 110 includes a RAID (Redundant Array of Independent Disks) application to be executed by processor 104.

The boot instructions include an initial set of instructions that executes directly from flash memory 110, which is typically referred to as a "boot loader". In the example discussed below, the boot loader performs a boot procedure that enables processors 102 and 104 to initialize in a controlled manner and begin executing their respective operating systems independently upon a reset, such as a startup of the integrated circuit 100.

Figure 2:
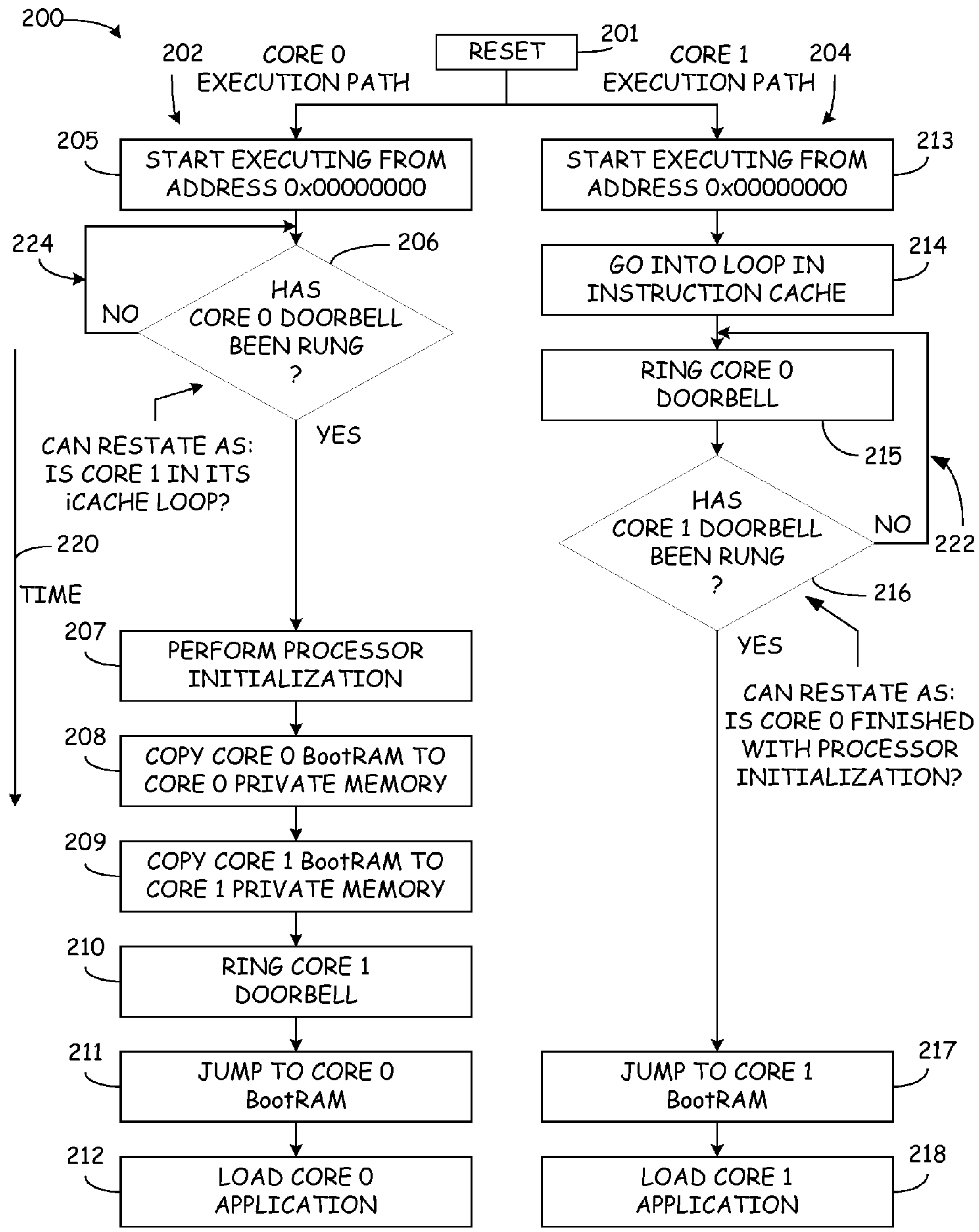
FIG. 2 is a flow chart illustrating an example boot procedure for the processors shown in FIG. 1.

FIG. 2 is a flow chart illustrating a boot procedure 200 implemented in part by the boot loader according to an exemplary embodiment. Upon the RESET input being asserted, at step 201, integrated circuit 100 initializes itself to a predetermined state. After the RESET input has been de-asserted, processors 102 and 104 follow separate execution paths 202 and 204, respectively. Execution path 202 includes steps 205-212, and execution path 204 includes step 213-218. In the flowchart shown in FIG. 2, time progresses in the direction indicated by arrow 220.

Following a reset, flash memory 110 is typically located or mapped to the starting address location 0x00000000, and processors 102 and 104 simultaneously start executing the boot loader instructions from a predetermined memory location within flash memory 110, such as location 0x00000000. Therefore, both processors cores 102 and 104 begin executing instructions from flash memory 110 after a reset, at steps 205 and 213.

However, only one of the processors 102 or 104 can perform some initialization duties, which are sometimes referred to as chip setup duties. To accomplish this requirement, the boot loader code includes a series of instructions that are loaded into the instruction cache of each processor 102 and 104. The instructions identify which processor is executing the code and place a designated processor, such as processor 104, in a tight loop, which executes completely from its instruction cache. For example at step 214, the boot loader instructions identify that processor 104 is executing the boot loader instructions and places processor 104 in a loop 222.

Upon entering loop 222, processor 104 "rings" a "Core 0" doorbell, at step 215, by setting a respective bit in doorbell registers 112, which notifies processor 102 that core 104 has entered the loop and is executing loop instructions entirely from its instruction cache. Processor 104 reads the loop instructions from its instruction cache line without going to flash memory for further instructions. In one embodiment, doorbell registers 112 (shown in FIG. 1) include a set of bits that can be monitored and set or reset by one or both of processors 102 and 104. However, the doorbells can be implemented in other ways in alternative embodiments, such as by activating a software interrupt. The term doorbell therefore includes any notification mechanism such as a register bit that can be set or reset or a software interrupt. Processor 104 then checks, at step 216, the status of a different set of bits in doorbell registers 112 to determine if its "Core 1" doorbell has been "rung" by processor 102, indicating that core 104 can exit the loop.

As explained in more detail below, while processor 104 remains in loop 222, processor 102 proceeds with various initializations procedures. Referring to path 202, the boot loader instructions initially place processor 102 in a loop 224 before continuing initialization. While in loop 224, processor 102 checks at step 206 whether processor 104 has set the "Core 0" doorbell at step 215, indicating that it has entered loop 222 and is operating entirely from its instruction cache.

Processor 102 is initially placed in loop 224 because processor 102 will re-map flash memory 110 at some point, and core 104 should not be executing from flash memory 110 when this happens. Processor 102 waits for the "Core 0" doorbell bit to be set by processor 104, and this notification tells processor 102 to exit loop 224 and continue executing the boot loader code.

The boot loader code, which is now executing on processor 102 only, continues initialization. At step 207, the boot loader instructions perform processor initialization. Initialization may include but is not limited to: enabling instruction cache, enabling peripheral bus 106, remapping flash memory 110 to an upper address in the address space of the memory map for each processor, initializing the memory controller unit 114 and a scrub memory (not shown). The instructions in the boot loader code then copies separate BootRAM images (copies of respective boot procedure instructions) from flash memory 110 to volatile memory 108, one copy for each processor 102 and 104. The term "private memory area" describes a portion of volatile memory 108 that is dedicated to a specific processor. Each processing core has its own private memory area. The boot loader code copies separate BootRAM images to these private memory areas. At step 208, processor 102 copies a "Core 0" BootRAM image to the private memory area of processor 102, and at step 209, processor 102 copies a "Core 1" BootRAM image to the private memory area of processor 104.

Once processor 102 has copied separate BootRAM images to volatile memory 108, processor 102 rings the "Core 1" doorbell by setting the respective bits in the doorbell registers 112 to indicate that the boot loader instructions have been completed.

At step 211, the boot loader code executing on processor 102 jumps to execute instructions from the "Core 0" BootRAM image in the private memory area of processor 102 within volatile memory 108. Similarly, at step 216, once processor 104 detects that its "Core 1" doorbell has been rung by processor 102, processor 104 jumps, at step 217, to the "Core 1" BootRAM image in the private memory area of processor 104. At this point, both processors 102 and 104 are executing instructions from their own private memory space within the volatile memory 108.

It is then the responsibility of each processor to complete some processor initialization steps and load its own processing operating system and application(s) from flash memory 110, which has been remapped to an upper address within the address space of each processor. For example, each processors 102 and 104 can enable a memory management unit (MMU), enable a data cache, start clocks, start serial communication, and then find the correct operating system to load into memory 108. For processor 102, the operating system that is loaded into the "Core 0" private memory area is the "System" (e.g., VxWorks OS), and for processor 104, the operating system is Linux, for example. Since these BootRAM initialization instructions execute out of volatile memory 108 (e.g., SDRAM), the instructions can be implemented with C source code that require stack space. If nothing exists in flash memory 110, the BootRam image instructions will ask for an operating system to be downloaded. Once the respective operating systems have been loaded, each processor can load one or more applications into volatile memory 108, at steps 212 and 218.

At this point, the boot procedure terminates, and each processor 102 and 104 is independently executing its own operating system from its own private memory area in volatile memory 108.

Figure 3:
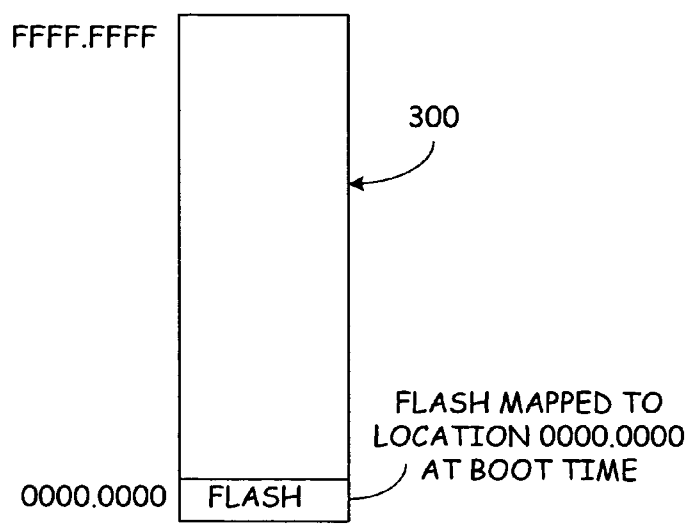
FIG. 3 is a diagram illustrating a memory map of the address space of both processors at boot time.

FIG. 3 is a diagram illustrating a memory map 300 of the address space at boot time. In this example, the address space ranges from address 0000.0000 to FFFF.FFFF is accessible. However, any other size or mapping can be used in alternative embodiments. Following a reset, both processors 102 and 104 have the same memory map 300. Non-volatile or "flash" memory 110 is initially mapped to location 0000.0000. However, flash could be mapped to any other address which can be used in alternative embodiments. Thus, following a reset, the integrated circuit has a reset state in which processors 102 and 104 have respective memory maps such that each processor begins executing the boot load instructions from the same address location in flash memory 110 upon exit from the reset state.

Figure 4:
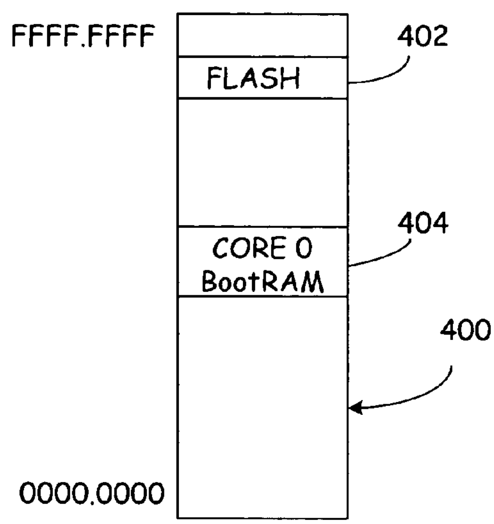
FIG. 4 is a diagram illustrating the memory map of one of the processors after completion of the boot loader.

After completion of the boot loader described in reference to FIGS. 1 and 2, the boot load instructions have remapped the memory space of each processor. FIG. 4 is a diagram illustrating the memory map 400 of processor 102 after completion of the boot loader. As described above, the non-volatile (e.g., flash) memory 110 is remapped to an upper address space 402, and the "Core 0" BootRAM image is mapped to a private memory area 404 for processor 102.

Figure 5:
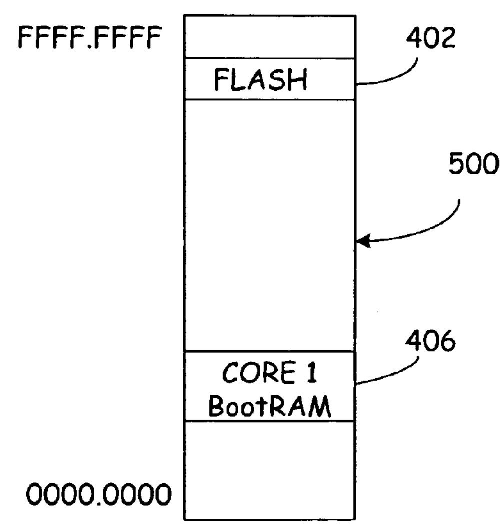
FIG. 5 is a diagram illustrating the memory map of the other processor core after completion of the boot loader.

FIG. 5 is a diagram illustrating the memory map 500 for processor 104 after completion of the boot loader. Again the non-volatile (e.g., flash) memory 110 is remapped to an upper address 402, and the "Core 1" BootRAM image is mapped to a private memory area 406 for processor 104. Upper addresses 402 can be the same or different between memory maps 400 and 500. Thus, the integrated circuit has a booted state in which the each of the respective memory maps have been uniquely remapped relative to the reset state such that each processor comprises a respective memory area within the volatile memory, which contains respective instructions for execution by that processor.

With the above boot procedure, a single integrated circuit die can include two or more independent processors, which can execute independent operating systems. The boot procedure allows integrated circuit 100 to be reset and each processor to reboot without conflict between the processors executing on the same flash memory. Following completion of the boot procedure, each processor can execute from its own private memory space in volatile memory and can thereafter load its own operating system and application.

Although the present disclosure has been described with reference to various embodiments, workers skilled in the art will recognize that changes may be made in form and detail without departing from the scope of the invention.

What is claimed is:

1. A boot process comprising:

a) executing boot load instructions stored in non-volatile memory by each of first and second processors embedded on the same integrated circuit;

b)1) prior to step c), placing the first processor in a first processor loop in response to the instructions until the second processor rings a first processor doorbell;

b)2) placing the second processor in a second processor loop in response to the instructions and ringing the first processor doorbell when the second processor is in the second processor loop;

b)3) releasing the first processor from the first processor loop after the first processor doorbell has been rung in step b)2);

c) executing an initialization procedure for the integrated circuit by the first processor in response to the instructions;

d) ringing a second processor doorbell upon completion of at least a portion of the initialization procedure; and e) releasing the second processor from the second processor loop after the second processor doorbell has been rung.

2. The boot process of claim 1 wherein upon reset of the integrated circuit, the first and second processors have a memory map such that each processor begins executing the boot load instructions from the same address location in the non-volatile memory in step a).

3. The boot process of claim 1 wherein after completion of at least a portion of the initialization procedure in step c), the first and second processors have respective, unique memory maps that each include a respective memory area within a volatile memory for the first and second processors.

4. The boot process of claim 3 and further comprising:

after step d), for each of the first and second processors, jumping to instructions stored in the respective memory area for that processor.

5. The boot process of claim 1 wherein the second processor executes the second processor loop entirely from a respective instruction cache of the second processor.

6. The boot process of claim 1 and further comprising:

f) prior to step d), in response to the boot load instructions executed by the first processor, copying first and second boot procedure instructions for the first and second processors, respectively, from the non-volatile memory to respective memory areas for the first and second processors within a volatile memory.

7. The boot procedure of claim 6 and further comprising:

g) after ringing the second processor doorbell in step d), within a sequence of the boot load instructions executed by the first processor, jumping to the first boot procedure instructions within the respective memory area in the volatile memory for the first processor; and h) after releasing the second processor from the second processor loop in step e), within a sequence of the boot load instructions executed by the second processor, jumping to the second boot procedure instructions within the respective memory area in the volatile memory for the second processor.

8. The boot procedure of claim 7 and further comprising:

i) in response to execution of the first and second boot procedure instructions by the first and second processors, copying first and second operating systems from the non-volatile memory to the respective memory areas in the volatile memory for the first and second processors.

9. The boot process of claim 1 and further comprising:

f) prior to step d), in response to the boot load instructions executed by the first processor, remapping an address location of the non-volatile memory from an initial address location to a different address location within a respective memory map for each of the first and second processors.

10. A multiple-processor system comprising:

an integrated circuit comprising first and second independent, embedded processors;

a volatile memory, which is shared by the first and second processors;

a non-volatile memory, which is shared by the first and second processors and comprises a set of boot load instructions executable by the first and second processors;

a reset state in which the first and second processors have respective memory maps such that each processor begins executing the boot load instructions from the same address location in the non-volatile memory upon exit from the reset state; and a booted state in which the each of the respective memory maps have been uniquely remapped relative to the reset state such that each processor comprises a respective memory area within the volatile memory, which contains a respective set of further instructions for execution by that processor.

11. The multiple-processor system of claim 10 wherein the boot load instructions comprise:

a) instructions that place the second processor in a second processor loop until the first processor rings a second processor doorbell;

b) instructions executable by the first processor that perform an initialization procedure for the integrated circuit;

c) instructions that ring the second processor doorbell upon completion of at least a portion of the initialization procedure; and d) instructions executable by the second processor that release the second processor from the second processor loop after the second processor doorbell has been rung.

12. The multiple-processor system of claim 11 and further comprising:

e) instructions that cause the first processor to jump to the respective set of further instructions stored in the respective memory area in the volatile memory for the first processor, after execution of the instructions in c); and f) instructions that cause the second processor to jump to the respective set of further instructions stored in the respective memory area in the volatile memory for the second processor, after execution of the instructions in d).

13. The multiple-processor system of claim 11 wherein the instructions in a) comprise:

a)1) instructions executed by the first processor prior to execution of the instructions in b) and place the first processor in a first processor loop until the second processor rings a first processor doorbell;

a)2) instructions executed by the second processor that place the second processor in the second processor loop and ring the first processor doorbell when the second processor is in the second processor loop; and a)3) instructions that release the first processor from the first processor loop after the first processor doorbell has been rung in step a)2).

14. The multiple-processor system of claim 11 wherein the second processor comprises an instruction cache and the second processor executes instructions, which perform the second processor loop, entirely from the instruction cache.

15. The multiple-processor system of claim 11 and further comprising:

e) instructions executed by the first processor prior to the instructions in c) that copy first and second boot procedure instructions for the first and second processors, respectively, from the non-volatile memory to the respective memory areas for the first and second processors within the volatile memory.

16. The multiple-processor system of claim 15 and further comprising:

f) instructions executable by the first processor after ringing the second processor doorbell in c) that jump to the first boot procedure instructions within the respective memory area in the volatile memory for the first processor; and g) instructions executable by the first processor after the second processor is released from the second processor loop in d) that jump to the second boot procedure instructions within the respective memory area in the volatile memory for the second processor.

17. The multiple-processor system of claim 16 wherein the first and second boot procedure instructions comprise respective instructions that, when executed by the first and second processors, respectively, copy first and second operating systems from the non-volatile memory to the respective memory areas in the volatile memory for the first and second processors.

18. The multiple-processor system of claim 11 and further comprising:

e) instructions executable by the first processor prior to the instructions in c) that remap an address location of the non-volatile memory from an initial address location to a different address location within a respective memory map for each of the first and second processors.

19. A multiple-processor system comprising:

an integrated circuit comprising first and second independent, embedded processors;

a volatile memory; and a non-volatile memory, which comprises a set of boot load instructions comprising:

a) instructions that place the first processor in a first processor loop until the second processor rings a first processor doorbell;

b) instructions that place the second processor in a second processor loop and ring the first processor doorbell when the second processor is in the second processor loop;

c) instructions that release the first processor from the first processor loop after the first processor doorbell has been rung;

d) instructions executable by the first processor after step c) that perform an initialization procedure for the integrated circuit;

e) instructions that ring a second processor doorbell upon completion of at least a portion of the initialization procedure; and f) instructions executable by the second processor that release the second processor from the second processor loop after the second processor doorbell has been rung.

* * * * *